United States Patent Office 3,064,321
Patented Nov. 20, 1962

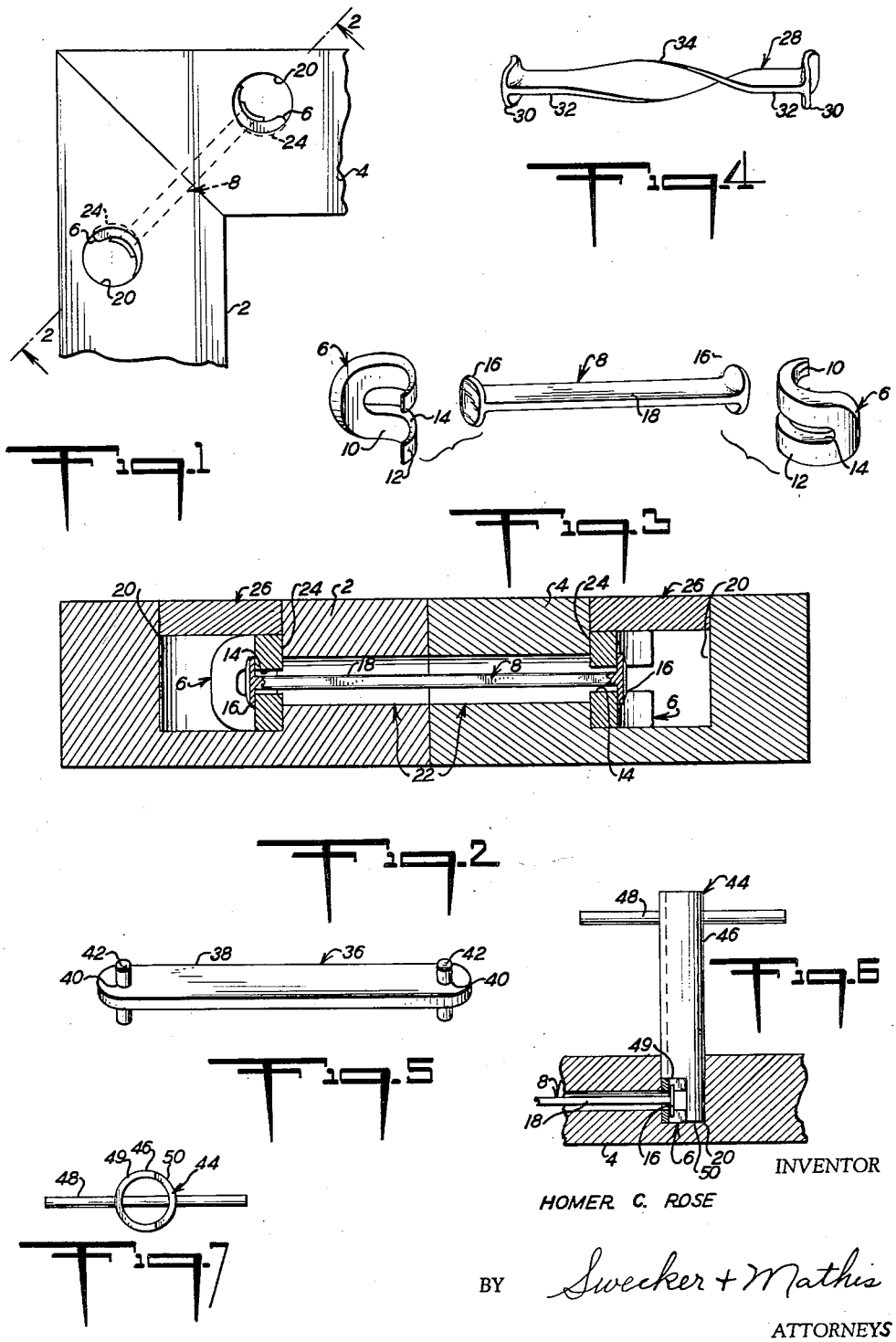

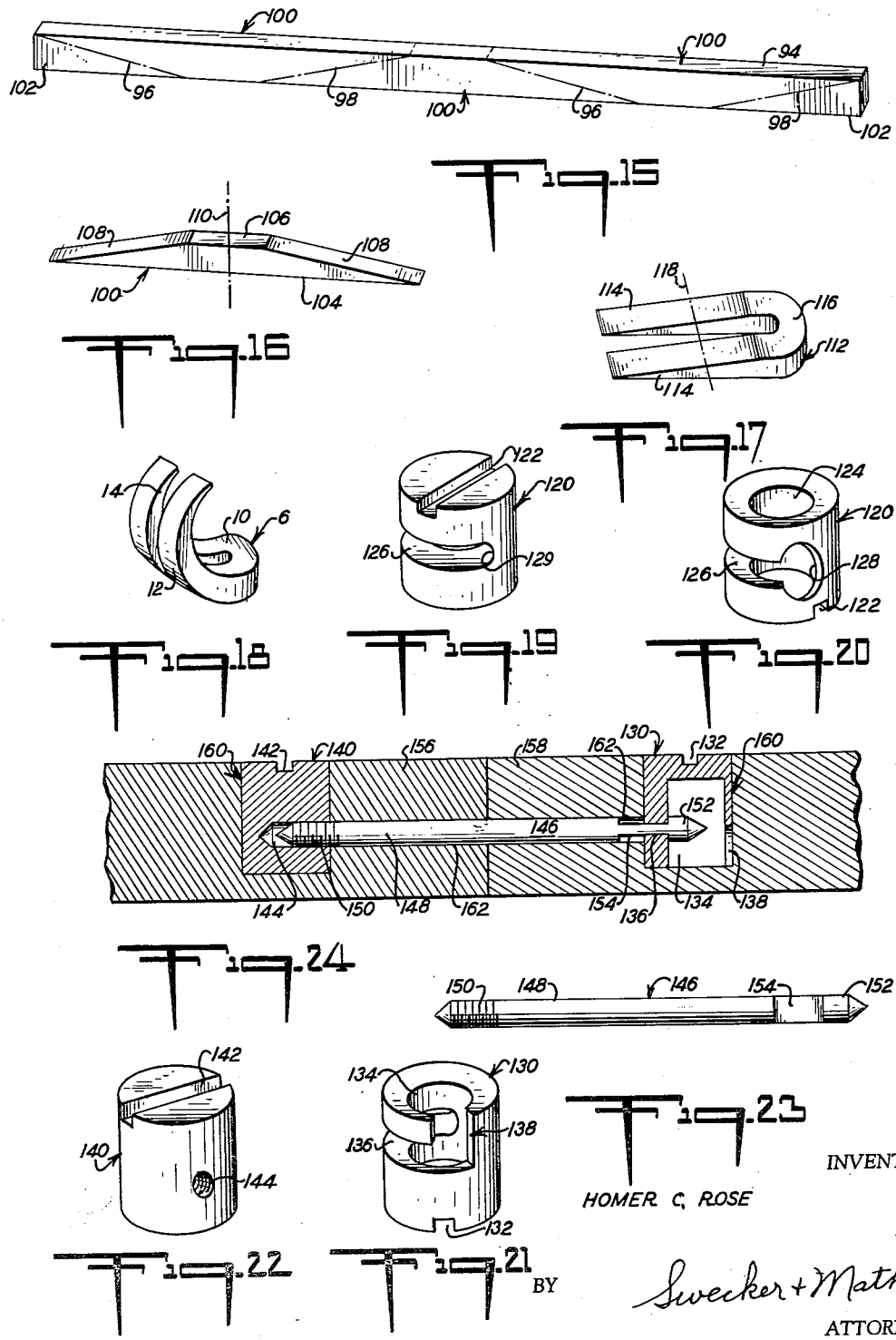

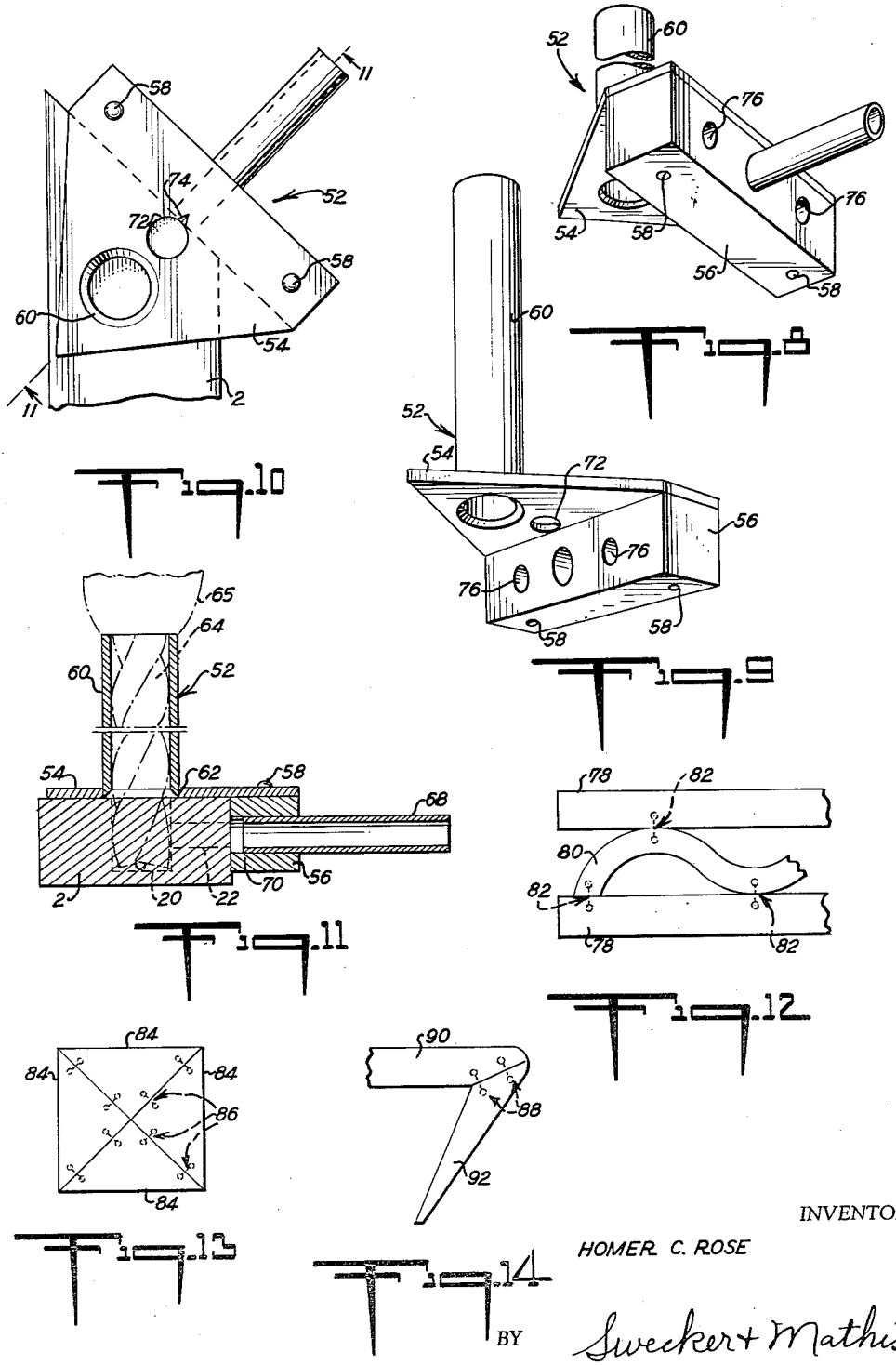

3,064,321
FASTENINGS
Homer C. Rose, 1508 Roosevelt Ave., Falls Church, Va.
Filed Oct. 14, 1957, Ser. No. 689,826
5 Claims. (Cl. 20—92.4)

This invention relates to the formation of joints between structural members of wood, metal, plastic, etc., and particularly to the provision of fastenings for such joints.

Home craftsmen and others who are obliged to work with limited facilities and equipment frequently experience difficulties in forming satisfactory joints between contacting structural members. Although the specific problems encountered vary a great deal, a brief description of the techniques now used by home craftsmen in forming miter joints between adjacent pieces of wood in articles of furniture will serve to suggest certain types of situations in which the present invention may be used advantageously.

Such a miter joint must be neat in appearance, and it must be rigid. In meeting these basic requirements, the home craftsman may glue the joint, fasten the members of the joint together by screws or other conventional fastening elements, or combine these techniques by spreading glue on the adjacent faces of the members of the joint and then holding the members together by screws while the glue sets.

If he chooses to glue the joint, he must provide some means for clamping the members of the joint together while the glue sets. This problem is complicated by the fact that the clamp used must be used that it will not mar the exposed surfaces of the wood. As far as I am aware, there is no commercially available clamp of simple construction for this purpose. The commercially available clamps which would be satisfactory for this purpose are all expensive pieces of equipment, and it frequently is necessary for the home craftsman to construct a special holding jig or clamp in order to obtain a satisfactory glued joint.

If he chooses to use screws or other conventional fastening elements in the joint, he is immediately faced with the very serious problem of locating the screws so that they will not detract from the appearance of the finished article of furniture. Since the fastening screws must extend through the abutting faces of the joint, they must pass through holes extending approximately perpendicularly with respect to such faces. Hence, in many instances, the screws, or at least the holes for receiving the screws, will be exposed on an edge of the joint.

The critical nature of this problem will be evident if the miter joint is visualized as being located at the corner of a table top or the like, with the abutting faces of the members to be connected together disposed in a vertical plane. In order to form a rigid joint, it is necessary that the screws extend at approximately right angles with respect to the abutting faces of the members to be connected together. Hence, in the example just mentioned, the screws must extend into the joint from the exposed lateral edges of the table top. This is not acceptable to most craftsmen, because it is not possible to finish the edges so as to give them a uniform appearance.

As a result, the use of conventional fastening elements in furniture joints has been limited to situations in which the holes for the fastening elements may be formed in concealed surfaces. In some instances, special blocks or the like have been attached to the concealed surfaces of the work pieces so that these may be used to seat the fastening elements for the actual joint. However, this procedure gives rise to still other problems in that the blocks must be shaped and oriented with precision in order to obtain an acceptable joint.

Various proposals have been made heretofore as to special clamp constructions and fasteners for overcoming these difficulties. One in particular deserves special consideration. It is contained in the United States patent to Gregg, No. 215,348, granted May 13, 1879.

This patent discloses a miter joint in which the upper face of each of the work pieces is provided with a recess and with a mortise extending from the face of the joint to the recess. When the work pieces are brought into contact with each other, these mortises are aligned with each other. The joint is held together by a fastening composed of two cam elements mounted in the recesses in the work pieces and a link disposed within the aligned mortises and connecting the cams together. Although the principles underlying this proposal are sound, the structures for carrying out these principles are expensive and are not easy to use. As a consequence, this proposal has not come into general use in the trade.

It is an important object of the present invention to overcome the objections and disadvantages mentioned above and to provide a fastening of novel construction which may be used easily to form satisfactory joints of various kinds between structural members.

Another object of this invention is to provide a cam fastening composed of a plurality of separable elements adapted to be disposed in cylindrical openings drilled in the work pieces to be joined by conventional drilling tools.

Another object of this invention is to provide a cam fastening of such construction that the elements thereof may be locked in position within a joint to prevent accidental displacement thereof.

Yet another object of this invention is to provide a durable joint construction which may be formed easily with conventional tools and which will satisfacy the exacting requirements of skilled craftsmen.

Another object of this invention is to provide an economical method for making a cam element suitable for use in a fastening.

Still another object of this invention is to provide a jig by which an ordinary drill may be guided and controlled so as to produce the necessary openings in work pieces for receiving the elements of a cam fastening.

The foregoing objects are realized, according to an embodiment of the invention, by the provision of a fastening composed of a cam element adapted to be disposed within a recess in one of the work pieces to be joined, a link adapted to be inserted into a bore connecting such recess with the joint face and shaped so as to cooperate with the cam element without rotating about its longitudinal axis, and means for holding the opposite end of the link against longitudinal movement with respect to the other of the work pieces to be joined. Such means may be an additional cam element, or it may be a simple holder.

One form of cam element for use in the fastening of this invention is a simple curved member having converging walls provided with an elongated slot through which the link of the fastening may pass. Such cam element may be formed by a sequence of simple cutting and bending operations, and as a result, it may be produced by mass production techniques at very low cost.

In order to facilitate the formation of the necessary recesses and bores in the work pieces to be joined together, the present invention also contemplates the provision of a jig for guiding and controlling the movements of a drill so as to assure the proper orientation of the openings in the work pieces. This jig includes tubular guides through which a drill may be inserted to form a recess in each work piece of the joint and a tubular guide through which a drill may be inserted to form a bore extending from the face of the joint inwardly to and communicating with such recess. Moreover, the jig is provided with a stop surface which comes into contact with the chuck of the drill when the proper depth for the recess in the work piece has been attained.

As will become apparent as the description proceeds these features of the invention make it possible to form a strong neat joint quickly and easily. Moreover, the various parts of the invention may be manufactured economically, so as to make it feasible for the home craftsman to use the invention.

A better understanding of the invention and its many features and advantages will be gained from a consideration of the following detailed description of certain embodiments thereof illustrated in the accompanying drawings, in which:

FIG. 1 is a plan view of a miter joint formed in accordance with the present invention;

FIG. 2 is a vertical cross sectional view taken along the line 2—2 in FIG. 1;

FIG. 3 is an exploded perspective view of the elements of the fastening shown in FIGS. 1 and 2;

FIG. 4 is a perspective view of another embodiment of the link element of the fastening of this invention;

FIG. 5 is a perspective view of another embodiment of the link element;

FIG. 6 is a vertical cross sectional view illustrating a tool in position for rotating a cam element of the fastening shown in FIGS. 1 to 3;

FIG. 7 is a bottom plan view of the tool shown in FIG. 6;

FIGS. 8 and 9 are perspective views of a jig for use in forming the necessary recesses and bores in the work pieces of the joint shown in FIGS. 1 and 2;

FIG. 10 is a plan view of the jig of FIGS. 8 and 9;

FIG. 11 is a vertical cross sectional view taken along the line 11—11 in FIG. 10 and illustrating the jig in operative relationship with respect to a work piece and a drill;

FIGS. 12, 13 and 14 are somewhat diagrammatic plan views of other types of joints which may be formed in accordance with the present invention;

FIGS. 15, 16, 17 and 18 are a sequence of perspective views illustrating a preferred procedure for forming the cam elements of the fastening shown in FIGS. 1 to 3;

FIG. 19 is a perspective view of a modified form of cam element for use in the fastening of this invention;

FIG. 20 is a perspective view of the cam element of FIG. 19 showing the element in an inverted position;

FIG. 21 is a perspective view similar to FIG. 20 but showing still another form of cam element for use in the fastening of this invention;

FIG. 22 is a perspective view of a plug element which may be used in lieu of one of the cam elements in the fastening of this invention;

FIG. 23 is a plan view of a link element which may be used in cooperation with the plug element of FIG. 22; and FIG. 24 is a view similar to FIG. 2, but showing a joint utilizing the fastening elements shown in FIGS. 21, 22 and 23.

In FIGS. 1 and 2 there is illustrated a miter joint of the type used in picture frames, furniture, etc. It includes two work pieces or members 2 and 4, the adjacent ends of which are cut at approximately forty-five degree angles and disposed in abutting relationship. The work pieces 2 and 4 may be of any suitable material. Joints of this character are required in the fabrication of wood, metal, plastics, and other materials, and it will be understood that the present invention is applicable to all of these materials.

The work pieces 2 and 4 are held together by a fastening which comprises two identical cam elements 6 and a link element 8 extending therebetween. It is preferred that these elements be formed of metal, but other suitable materials may be employed if desired. As best shown in FIG. 3, each of the cams 6 is curved and includes inner and outer vertical faces 10 and 12 which converge toward one end of the cam. Each of the cams 6 also is provided with an elongated slot 14 extending inwardly from the narrow end of the cam at a level intermediate the upper and lower edges thereof.

The link 8 may be a simple rectangular bar the ends of which are upset or swaged to provide enlarged heads 16 of greater thickness than the width of the slot 14 in the cam member 6. The intermediate or shank portion 18 of the link 8, however, must be smaller than the slot 14 in the cam member 6 so that this portion 18 of the link may pass through the slots 14 to dispose the enlarged heads 16 adjacent the inner faces 10 of the cams 6.

In order to avoid any possible confusion as to terminology, the above and further references to the "thickness" and "width" of portions of the fastening elements disclosed herein will be understood to mean the following: the "width" of the link 8, and the various portions thereof, refers to the horizontal extent thereof; the "thickness" of the link 8 refers to the vertical dimension thereof; and the "width" of the slot 14 in the cam 6 refers to the vertical dimension of the slot, all as viewed in FIGS. 2 and 3.

In use, the cam elements 6 are disposed within vertical recesses 20 in the work pieces 2 and 4, and the link element 8 is disposed within aligned horizontal bores 22 extending from the abutting faces of the members 2 and 4 to and communicating with the respective recesses 20 in such members. This relationship is established by placing each of the cam members 6 within its recess 20 at a position opposite the bore 22 communicating therewith, inserting the link 18 into the bore 22 in member 2 far enough so that one of its heads 16 projects into the recess 20 communicating therewith, rotating the cam element 6 in such recess about the axis of the recess to bring its slot 14 into embracing relationship with respect to the upper and lower faces of the shank 18 of the link 8 with the head 16 of the link 8 disposed adjacent the inner face 10 thereof, moving the member 4 into abutting relationship with the member 2 by passing its bore 22 over the protruding end of the link 8, and then rotating the other cam member 6 to bring its slot 14 into cooperative relationship with respect to the adjacent end of the link 8. The tension in the link 8 may be adjusted as desired by the degree of rotation imparted to the cam members 6.

In FIGS. 1 and 2 it should be noted that the thick ends of cam members 6 are embedded in the walls of the cylindrical recesses 20 in the members 2 and 4, as indicated by the reference numerals 24. This is caused by compression of these portions of the walls of the recesses 20 against which the cams 6 bear during tightening of the fastening. The relationship is an important one in that it tends to increase the force which would be required to rotate the cam members 6 in a reverse direction to loosen the fastening. In order to bring about such reverse rotation, it would be necessary to move the ends of the cam elements 6 out of the depressions 24, and this could be accomplished only by increasing the tension in the link 8. It will be understood, of course, that this relationship is obtained only in those situations in which the work pieces 2 and 4 are formed of wood or some other soft material which will be deformed upon tightening of the fastening elements.

If desired, glue may be applied to the abutting faces of the work pieces 2 and 4 prior to the assembly of the joint. When this is done, the fastening composed of the cams 6 and the link 8 serves effectively to claimp the work pieces 2 and 4 together during the period required for the glue to set. After the glue has set, the cams 6 may be removed from the joint, if desired, for use in the making of another joint. It is preferred, however, that the cams 6 be left in the joint in cooperative relationship with respect to the ends of the link 8 so that the fastening may contribute to the overall integrity of the joint.

In either event, it may be desirable to dispose plugs 26 in the open ends of the recesses 20 in the work pieces 2 and 4 to give the joint a finished appearance. These plugs 26 have been omitted from FIG. 1 in order to reveal the interior construction of the joint, but it will be understood that they conform in all respects to the plugs frequently used in the wood working art to conceal screws and the like. Such plugs are commercially available in a variety of sizes and styles for use in cylindrical openings so that the craftsman will experience no difficulty in obtaining them.

This represents a very substantial advantage over the joint construction proposed in Gregg patent, No. 215,-348, mentioned above. Plugs for use in mortises such as those shown in the patent would have to be formed with a pair of parallel sides and with concave ends to match the curvature of the adjacent recesses in the work pieces. Plugs of this type are not available on the market, and they would be difficult to make.

It will be understood also that the recesses 20 in the work pieces 2 and 4 need not extend inwardly from the upper faces of these work pieces. This arrangement has been illustrated in FIGS. 1 and 2 merely for the sake of convenience. In practice, the recesses 20 preferably are formed in surfaces which will not be exposed in the completed article, and it makes no difference whether these surfaces are on the bottom, the top, or a side of the article.

As illustrated, the enlarged heads 16 at the ends of the link 8 are generally circular or rounded in vertical cross section. This shape is not critical insofar as the cooperation of the link with the cams 6 is concerned, but it is desirable in that it permits the heads 16 to pass through bores 22 which have diameters approximately equal to the width of the shank 18 of the link 8.

It will be noted also that the inner, cam-engaging faces of the heads 16 of the link 8 are curved in a horizontal plane, so the heads conform substantially to the curvature of the inner faces 10 of the cams 6. As a result, there is very little tendency toward binding of the parts during rotation of the cams 6. For many uses, this refinement is not essential however, and it may be omitted if desired.

One limitation inherent in the construction of the link 8 is that its shank portion 18 sometimes may move slightly with respect to bores 22 in which it is located. It is necessary, of course, that the width of the link 8 be slightly less than the diameter of the bore 22 in order that the link may be inserted into the bore, but this slight clearance need not be great enough to permit substantial movements of the link in a horizontal direction after insertion into the bore. Nevertheless, this small clearance usually is sufficient to permit some movement of the shank 18 in a vertical direction with respect to the bore 22. This is true particularly where the work pieces 2 and 4 are of wood or other soft material, because the lateral edges of the shank portion 18 of the link 8 tend to deform the walls of the bores 22 when forces of a substantial nature are applied thereto tending to move the shank portion 18 in a vertical direction, as viewed in FIG. 2.

FIG. 4 illustrated a modified form of link element 28 which may be employed in the fastening of this invention in lieu of the link 8 to overcome the limitation just mentioned. It includes a pair of heads 30 on the ends of a shank having flat end portions 32 and a twisted central portion 34. As will be evident, this construction may be produced by merely twisting the link 8 of FIG. 3.

This link 28 cooperates with the cam members 6 in the formation of a joint in much the same manner as the link 8 of FIG. 3. Its heads 30 are adapted to be disposed adjacent the inner faces 10 of the cams 6, its flat shank portions 32 are adapted to cooperate with the slots 14 in the cams 6 in exactly the same way that the end portions of the shank 18 of the link 8 cooperate with these slots, and the central portion 34 of the shank is adapted to extend through the bores 22 in the work pieces 2 and 4. However, the edges of the twisted central portion 34 of the shank of the link 28 contact the walls of the bores 22 along two lines which extend spirally about the axes of these bores 22. Hence, the resistance offered by link 28 to relative movement between the work pieces 2 and 4 in any direction is comparable to the resistance offered by the link 8 to relative movement between the pieces 2 and 4 in a horizontal direction, as viewed in FIG. 2. As a result, the rigidity of a joint formed by using the link 28 is somewhat greater than that of a joint formed by using the link 8.

FIG. 5 illustrates a third form of link 36 for use with the cams 6. It includes an elongated bar 38 which constitutes the shank of the link. Adjacent its ends, the bar 38 is provided with vertical holes 40 which receive the central portions of vertical pins 42. The pins 42 may be sweat-soldered in the bar 38 after insertion into these holes 40, or, if desired, they need not be fixed rigidly to the bar 38. In the latter case, the pins 42 may be substantially longer than the diameter of the bores 22 which receive the link, because they need not be inserted into the holes 40 until atfer the bar 38 has been positioned in the bores 22. In the completed link 36, they serve as heads comparable in function to the heads 16 and 30 of the links 8 and 28 shown in FIGS. 3 and 4. It is preferred that the pins 42 be circular in horizontal cross section so that they will move freely along the curved inner surfaces 10 of the cams 6.

It should be noted particularly that in all three of the links 8, 28, and 36 heretofore described, the shank portions which cooperate with the slots 14 are of a greater width than the width of the slots 14. This relationship is significant in that it prevents rotation of the links about their central axes, and it is not possible for the links to shift so as to align their enlarged heads with the slots 14 in the cams 6.

The cams 6 may be moved about the axes of their respective recesses 20 by any convenient means. It is preferred, however, that a special tool be provided for this purpose. Such a tool is illustrated in FIGS. 6 and 7 of the drawings and is designated generally by the numeral 44.

The tool 44 is composed of an elongated pipe or tube 46 and a handle 48 secured to the upper end portion of the tube 46 by welding or other suitable means. At its lower end, a portion of the wall of the tube 46 is broken away, as indicated by the numeral 49, to leave a downwardly projecting finger 50 of an arcuate extent such that it may be inserted into the recess 20 along with a cam 6, as shown in FIG. 6. When in this position, the finger 50 bears against an end of the cam 6 during rotation of the tool 44 relative to the recess 20 and serves to drive the cam 6 in the direction of rotation of the tool.

In situations where joints of the character illustrated in FIG. 1 are to be made by relatively unskilled craftsmen or made in large quantities, it is highly desirable that means be provided for regulating the depth of the recesses 20 in the work pieces 2 and 4 and for establishing the proper alignment of the bores 22. A jig 52 for this purpose is shown in FIGS. 8 to 11. This novel jig construction makes it possible to form the recesses 20 and the bores 22 quickly and easily with simple drilling tools.

The jig 52 includes a horizontal plate 54 adapted to rest upon the top face of a work piece, and a rectangular block 56 adapted to abut against the edge of the work piece. The lower surface of the plate 54 and the vertical inner surface of the block 56 intersect at a right angle, so that these surfaces fit smoothly onto the faces of the work piece to be operated upon. As shown, the plate 54 and the block 56 are secured together by rivets 58, but it will be apparent that any other suitable means may be used for this purpose.

The drilling of the recess 20 in a work piece 2 is controlled by a tube or pipe 60 positioned in a hole 62 in the plate 54 and secured to the plate 54 by welding or other suitable means. As suggested in FIG. 11, the pipe 60 is of an internal diameter slightly greater than the external diameter of a drill bit 64 adapted to drill the recess 20 in the work piece 2. This bit 64 preferably is of the type which is designed to drill to a substantially flat bottom.

The length of the pipe 60 is such that the chuck 65 of the drill abuts against the upper end of the pipe 60 when the drill bit 64 has penetrated the work piece 2 to a depth corresponding to the required depth for the recess 20. In use then, the pipe 60 serves both as a guide for the drill bit 64 and as a stop to limit the depth of the recess 20. All that need be done in order to provide a recess 20 of the proper size is to insert the rotating drill bit 64 into the guide pipe 60 and move it downwardly until the chuch 65 of the drill strikes the upper end of the tube 60.

It is recognized that in some circumstances, it may be desirable to drill recesses 20 of different depths. In such circumstances, the length of the guide tube or pipe 60 may be made adjustable by providing it with a stop member adjacent its upper end mounted so that the upper edge of the stop member may project upwardly from the tube 60 to varying extents or heights. A telescoping tube arrangement would be suitable for this purpose. A similar result can be achieved by a spacer or the like disposed about that portion of the drill bit which is adjacent to the chuck of the drill and either loose thereon or secured thereto by a set screw or other suitable means. A series of such spacer rings of different lengths, each adapted to contact the upper end of the guide pipe 60 during a recess-forming operation, might be provided, and with such a set, the depths of the recesses 20 could be controlled over any desired range.

The drilling of a bore 22 in a work piece presents no problem as to depth, because the operator of the drill has no difficulty in sensing the penetration of the drill bit into the recess 20. However, there is a very substantial problem of alignment or orientation involved in the drilling of the bores 22. In order to fix the orientation of the bore 22, the jig 52 is provided with a second guide tube or pipe 68 extending into a horizontal hole 70 through the block 56 and secured rigidly to the block 56. The axis of the tube 68 is perpendicular to the inner face of the block 56 and is disposed in the same vertical plane as the axis of the tube 60. Therefore, a bore 22 formed by the insertion of a drill bit into the guide tube 68 must extend perpendicularly with respect to the edge of the work piece 2 which is to form the joint and it must intersect the recess 20.

It will be understood that the jig 52 is used in forming the recesses 20 and the bores 22 in both of the work pieces 2 and 4 to be joined together in accordance with the principles of the present invention. After the recess 20 and the bore 22 in the work piece 2 are formed, the jig 52 may be applied to the work piece 4.

In order to assure alignment of the two bores 22 in the work pieces 2 and 4, it is desirable to place the two work pieces in abutting relationship prior to the formation of the holes and to draw a line on their upper faces perpendicular to the line of juncture therebetween. This procedure gives a reference marking by which the proper position of the jig 52 with respect to each of the work pieces may be determined prior to the actual drilling operations. In order that this marking on the work pieces may be seen by the worker, the top plate 54 of the jig 52 is provided with a sight opening 72 having a notch or other mark 74 adjacent its periphery at a point in the vertical plane containing the axes of the guide tubes 60 and 68. In use, this mark 74 is lined up with the mark on the work piece, and the jig 52 is clamped into position with respect to the work piece immediately prior to the drilling operation. Any suitable type of clamp may be used for this purpose.

It is desirable that the jig 52 also include horizontal guide holes 76 in the block 56 on opposite sides of the hole 70 in which the guide tube 68 is mounted. These holes 76 may serve as guides for the drilling of additional holes in the joint-forming face of a work piece in instances where it is desired to include dowels in the joint to enhance its rigidity.

Although repeated references have been made to a miter joint, it will be evident that the present invention is not restricted to joints of this charatcer. It may be applied to simple butt joints and to many other types of joints. FIGS. 12, 13 and 14 suggest some of the possibilities in this respect.

FIG. 12 diagrammatically illustrates an ornamental construction made up of a pair of spaced apart straight members 78 connected together by a sinuous member 80. Fastenings 82, according to the present invention, may be used at the points where the sinuous member 80 contacts the members 78 to hold the members together in a rigid manner. In this connection, it should be noted particularly that the use of the fastenings 82 is not limited in any way by the fact that they must cooperate with curved portions of the sinuous member 80.

FIG. 13 diagrammatically illustrates a flat rectangular body made up of four triangular sections 84 secured together along their adjacent edges by fastenings 86, according to the present invention. Structures of this type are sometimes desirable in the production of ornamental effects in that the several triangular members 84 may have different appearances which, when combined in the manner suggested, produce a pleasing mosaic effect.

In this view two of the fastenings 86 of this invention have been illustrated along each of the joints between adjacent ones of the members 84. It will be understood in this connection that the number of fastenings to be employed in any given joint is a factor to be determined on the basis of the strength and rigidity requirements for the particular joint.

FIG. 14 also illustrates diagramamtically the use of a plurality of fastenings 88, according to the present invention, in a single joint. In this view the work pieces 90 and 92 do not intersect at a right angle, and their shapes are such a craftsman would find it very difficult to joint them together by conventional means.

Still other potential applications of the fastening of this invention will suggest themselves to persons skilled in the art. In addition to the many types of joints between structural members which may be formed by the use of the fastening of this invention, there are other, perhaps less conventional, areas in which the fastening may be particularly desirable. As an example, it is pointed out that metal fastenings sometimes are used to hold broken bones in place in the bodies of living creatures. The fastening of this invention would serve such a purpose admirably.

In spite of its wide utility, the fastening shown in FIGS. 1 to 3 may be manufactured quite economically. In this connection attention is invited to FIGS. 15 through 18, which diagrammatically illustrate a process sequence which may be employed to produce the cams 6 in quantity. These cams 6 may be produced from a simple rectangular steel bar 94 by a series of cutting and bending operations.

In FIG. 15, numerals 96 and 98 have been applied to planes along which the bar 94 should be cut by a hand mill or other suitable equipment of conventional construction to produce cam blanks 100 of the type shown in FIG. 16. All of the planes 96 are parallel to each other, and all of the planes 98 are parallel to each other. However, the planes 96 and 98 nearest the left end of FIG. 15 converge downwardly, the planes 96 and 98 in the middle of FIG. 15 converge upwardly, etc. In other words, alternate ones of the planes 96 and 98 are parallel, while adjacent ones of the planes 96 and 98 are disposed in converging relationship. This pattern is a significant one, because it minimizes the number of cuts required to produce the blanks 100 and because it minimizes the amount of waste material which cannot be used to produce cam elements 6. In this connection, it is pointed out that the only portions of the bar 94 which are wasted are the triangular end portions 102. If the bar 94 were very long, as would be the case in a production situation, these portions 102 would represent only a small fraction of the mass of the bar 94.

The shape of each of the cam blanks 100 is substantially as shown in FIG. 16. Each blank 100 has an edge 104 which is straight along the entire length of the blank, and an opposite edge which includes a central portion 106 substantially parallel to the edge 104 and end portions 108 which converge toward the edge 104.

The next step in the manufacturing process is the bending of the blank 100 about its vertical center line 110 to produce the U-shaped configuration 112 shown in FIG. 17. The member 112 includes a pair of tapered legs 114, formed by the tapered end portions of the blank 100, and a web 116 of substantially constant thickness, formed by the central portion of the blank 100.

The final operation in the cam-forming process also is a bending operation. In this instance, the member 112 is bent downwardly, as viewed in FIG. 17, about a line 118 disposed intermediate the ends of its tapered legs 114 to produce the completed cam element 6 shown in FIG. 18. During this last bending operation, the material on the outside surface of the member 112 flows slightly, so that the lines of juncture between the tapered legs 114 and the web 116 of the member 112 are not present in the completed cam 6.

From the above, the inexpensive nature of the cam 6 will be readily apparent. The forming operations may be carried out on a mass production basis utilizing conventional cutting and bending equipment. For this reason, it is anticipated that the element 6 generally will be preferred for use in the fastening of this invention.

However, in situations where economy may be sacrificed in the interest improved appearance and performance, other cam constructions may be employed in the present invention. FIGS. 19 and 20 illustrate one such construction.

The cam 120 shown in FIGS. 19 and 20 is a cylindrical plug having a screw driver slot 122 in one of its ends and having an eccentric bore 124 in its opposite ends. The side wall of the cam 120 is provided with a horizontal slot 126 communicating with the eccentric bore 124. One end of the slot 126 communicates with an enlarged opening 128 in a thin portion of the wall of cam 120 near the point of closest approach of the wall of the bore 124 to the external surface of the cam 120. The opposite end of the slot 126 is closed, as indicated by the reference numeral 129, at a point slightly beyond the thickest portion of the wall of the cam 120.

The cam 120 may be used in much the same manner as the cam 6 shown in FIGS. 1 to 3. Its enlarged opening 128 permits the insertion of the enlarged head on a link element of the fastening into the eccentric bore 124 of the cam 120, and its horizontally extending slot 126 is wide enough to permit movement of the shank of the link element along the slot 126 during rotation of the cam 120. During such rotation the enlarged head of the link element bears against the wall of the eccentric bore 124 adjacent the edges of the slot 126, and the link is moved inwardly as the thickness of the wall of the cam 120 increases toward the closed end 129 of the slot 126.

It should be noted particularly that the cam 120 moves past "dead center" when rotated sufficiently to position the end wall 129 of the slot 126 in contact with the link element of the fastening. This produces a locking effect which is particularly advantageous in situations where the fastening of this invention is used to connect metal parts which are subjected to vibrations during use. The tension in the connecting link must be increased, before the cam element 120 can be rotated in a reverse direction sufficiently to bring the head of the link into a position from which it may be withdrawn through the enlarged opening 128 of the cam 120.

A similar cam 130 is shown in FIG. 21. It too is a cylindrical plug having a screw driver slot 132 in one of its ends, an eccentric bore 134 in its opposite end, and a circumferential slot 136 in its side wall. However, in this embodiment, the slot 136 terminates in an open-ended notch 138 which extends vertically from the level of the slot 136 to the bottom of the cam 130.

This construction may be desirable in some instances, because it permits the cam 130 to be inserted into its recess in a work piece after the link element of the fastening has been inserted into its bore. When the cam is moved into its recess, the notch 138 passes around the shank of the link so as to position the enlarged head of the link within the eccentric bore 134 in the cam 130. Subsequent rotation of the cam 130 about its central axis will cause the slot 136 to move with respect to the shank of the link and will cause the enlarged head of the link to bear against the wall of the eccentric bore 134 adjacent to the edges of the slot 136.

Still another type of modification is suggested in FIG. 22. The plug 140 shown in this view is not a cam, but is rather a holding element for restraining axial movement of a link element which cooperates at its opposite end with a cam of any of the configurations described heretofore. In many joints, the entire amount of axial movement required of the connecting link of the fastening may be brought about by a single cam element, and in these instances, the opposite of the link element may be simply held in position with respect to the other work piece of the joint. The holding element 140 is a cylinder provided with a screw driver slot 142 in one of its ends and provided with a threaded bore 144 in its side wall.

The threaded bore 144 is adapted to cooperate with a link element 146 illustrated in FIG. 23. The link element 146 includes a cylindrical body portion 148 provided with screw threads 150 at one end thereof, a head 152 at its opposite end, and a cut away portion 154 spaced slightly from its head 152.

The precise manner in which the elements illustrated in FIGS. 21, 22 and 23 cooperate in the formation of a joint will be readily understood from a consideration of FIG. 24. In this view, two work pieces or members 156 and 158 have been shown in abutting relationship. Each of the work pieces 156 and 158 is provided with a cylindrical recess 160 and a lateral bore 162 corresponding, respectively, to the recesses 20 and the bores 22 illustrated in FIG. 2.

In assembling the joint shown in FIG. 24, the holding element 140 is inserted into the recess 160 in the work piece 156 first, and it is rotated as required to bring its threaded bore 144 into alignment with the bore 162 in the work piece 156. Then, the link 146 may be inserted through the bore 162 in the work piece 156 into cooperative relationship with respect to the threaded bore 144 in the plug 140. The threads 150 on the link 146 cooperate with the threads in the bore 144 to hold the link against axial movement with respect to the plug 140. It should be noted in this connection, however, that the bore 144 is of substantial length, so that some adjustment of the position of the link 146 is possible in order that its head 152 may be disposed in proper position for cooperation with the cam element 130 located within the recess 160 in the member 158.

After the link 146 has been attached to the plug 140 in the work piece 156, the bore 162 in the other work piece 158 is passed over the projecting end of the link 146 to bring the work piece 158 into abutting relationship with respect to the work piece 156. This causes the head 152 of the link 146 to project slightly into the recess 160 in the member 158. The cam element 130 then may be inserted into the recess 160 in the member 158 by passing its notch 138 about the link 146. This brings the slot 136 in the cam 130 into alignment with the cut away portion 154 of the link 146, so that, upon subsequent rotation of the cam 130 about its central axis, the cut away portion 154 of the link 146 will be positioned within the slot 136 and the head 152 of the the link 146 will bear against the wall of the eccentric bore 134 in the cam 130. As will be apparent, the degree of rotation imparted to the cam 130 will determine the tightness of the joint formed by the fastening shown in FIG. 24.

Another variation which should be mentioned is that the holding element 140 of FIG. 24 may be omitted entirely, when desired, and the link 146 may be held in position by providing the bore 162 in the work piece 156 with screw threads for cooperation with the threaded portion 150 of the link 146. Moreover, in instances where the work piece 156 is of wood, the portion 150 on the link 146 may be formed as a wood screw, so that no special preparation of the piece 156 would be required in order to anchor the link 146 with respect thereto.

Although several embodiments of the invention have been described and illustrated in detail, various other modifications and variations will suggest themselves to persons skilled in the art. In particular, it is pointed out that the structural features of the individual embodiments illustrated in the drawings may be combined in any desired manner to produce an operable fastening without departing from the spirit and scope of the present invention. It is intended therefore that the foregoing detailed description be considered as exemplary only and that the scope of this invention be ascertained from the following claims.

I claim:

1. In combination, a pair of members each having first and second faces extending approximately at right angles with respect to each other, each of said members having a cylindrical recess in its first face and a cylindrical bore extending from said recess to its second face, said bores being of the same diameter and said members being disposed with their second faces in contact and said bores in axial alignment, a curved cam element of an arcuate extent substantially less than 360° disposed entirely within each of said recesses and below said first faces of said members, each of said cam elements having a curved outer face bearing against the wall of the recess within which it is disposed adjacent to the bore communicating therewith, each of said cam elements also having a curved inner face converging toward said outer face at one end of the cam element and an open ended slot extending along said faces at the level of the adjacent bore from said end of the cam element to a point spaced from the opposite end of the cam element, and link means extending through said aligned bores from the recess in one of said members to the recess in the other of said members, said link means including a central portion having a cross-sectional dimension substantially equal to the diameter of said bores and including head portions of greater thickness than said slots in said cams located adjacent the inner faces of said cams and including shank portions adjacents said head portions passing through said slots in said cams, said shank portions having widths greater than the widths of said slots to prevent rotation of said link means relative to said slots.

2. In combination, a pair of members each having first and second faces extending approximately at right angles with respect to each other, each of said members having a cylindrical recess in its first face and a cylindrical bore extending from said recess to its second face, said bores being of the same diameter and said members being disposed with their second faces in contact and said bores in axial alignment, a curved cam element of an arcuate extent substantially less than 360° disposed entirely within each of said recesses and below said first faces of said members, each of said cam elements having a curved outer face bearing against the wall of the recess within which it is disposed adjacent to the bore communicating therewith, each of said cam elements also having a curved inner face converging toward said outer face at one end of the cam element and an open ended slot extending along said faces at the level of the adjacent bore from said end of the cam element to a point spaced from the opposite end of the cam element, and link means extending through said aligned bores from the recess in one of said members to the recess in the other of said members, said link means including a central portion having a cross-sectional dimension substantially equal to the diameter of said bores and including head portions of greater thickness than said slots in said cams located adjacent the inner faces of said cams and including shank portions adjacent said head portions passing through said slots in said cams, said head portions being curved to conform generally with the curvature of said inner faces of said cam elements, and said shank portions having widths greater than the widths of said slots to prevent rotation of said link means relative to said slots.

3. In combination, a pair of wood members each having first and second faces extending approximately at right angles with respect to each other, each of said members having a cylindrical recess in its first face and a cylindrical bore extending from said recess to its second face, said bores being of the same diameter and said members being disposed with their second faces in contact and said bores in axial alignment, a curved cam element of an arcuate extent substantially less than 360° disposed entirely within each of said recesses and below said first faces of said members, each of said cam elements having a curved outer face bearing against the wall of the recess within which it is disposed adjacent to the bore communicating therewith, each of said cam elements also having a curved inner face converging toward said outer face at one end of the cam element and an open ended slot extending along said faces at the level of the adjacent bore from said end of the cam element to a point spaced from the opposite end of the cam element, and link means extending through said aligned bores from the recess in one of said members to the recess in the other of said members, said link means including a central portion having a cross-sectional dimension substantially equal to the diameter of said bores and including head portions of greater thickness than said slots in said cams located adjacent the inner faces of said cams and including shank portions adjacent said head portions passing through said slots in said cams, said shank portions having widths greater than the widths of said slots to prevent rotation of said link means relative to said slots, the wall of each of said recesses having an indentation therein formed by the crushing action of said cam elements against the wood and providing a shoulder for resisting reverse rotation of the cam element in such recess.

4. In combination, a pair of members each having first and second faces extending approximately at right angles with respect to each other, each of said members having a cylindrical recess in its first face and a cylindrical bore extending from said recess to its second face, said bores being of the same diameter and said members being disposed with their second faces in contact and said bores in axial alignment, a curved cam element of an arcuate extent substantially less than 360° disposed entirely within each of said recesses and below said first faces of said members, each of said cam elements having a curved outer face bearing against the wall of the recess within which it is disposed adjacent to the bore communicating therewith, each of said cam elements also having a curved inner face converging toward said outer face at one end of the cam element and an open ended slot extending along said faces at the level of the adjacent bore from said end of the cam element to a point spaced from the opposite end of the cam element, and link means extending through said aligned bores from the recess in one of said members to the recess in the other of said members, said link means including a central portion having in each of a plurality of planes containing the axis of said aligned bores a cross-sectional dimension substantially equal to the diameter of said bores and including head portions of greater thickness than said slots in said cams located adjacent the inner faces of said cams and including shank portions adjacent said head portions passing through said slots in said cams, said shank portions having widths greater than the widths of said slots to prevent rotation of said link means relative to said slots.

5. In combination, a pair of members each having first and second faces extending approximately at right angles with respect to each other, each of said members having a cylindrical recess in its first face and a cylindrical bore extending from said recess to its second face, said bores being of the same diameter and said members being disposed with their second faces in contact and said bores in axial alignment, a curved cam element of an arcuate extent substantially less than 360° disposed entirely within each of said recesses and below said first faces of said members, each of said cam elements having a curved outer face bearing against the wall of the recess within which it is disposed adjacent to the bore communicating therewith, each of said cam elements also having a curved inner face converging toward said outer face at one end of the cam element and an open ended slot extending along said faces at the level of the adjacent bore from said end of the cam element to a point spaced from the opposite end of the cam element, and link means extending through said aligned bores from the recess in one of said members to the recess in the other of said members, said link means including a twisted central portion having in each of a plurality of planes containing the axis of said aligned bores a cross-sectional dimension substantially equal to the diameter of said bores and including head portions of greater thickness than said slots in said cams located adjacent the inner faces of said cams and including shank portions adjacent said head portions passing through said slots in said cams, said shank portions having widths greater than the widths of said slots to prevent rotation of said link means relative to said slots.

References Cited in the file of this patent

UNITED STATES PATENTS

| | | |
|---|---|---|
| 147,659 | Leduc | Feb. 17, 1874 |
| 215,348 | Gregg | May 13, 1879 |
| 571,042 | Edquist | Nov. 10, 1896 |
| 1,736,231 | Sunnen | Nov. 19, 1929 |
| 1,941,892 | Greve | Jan. 2, 1934 |
| 2,778,251 | Gunas | Jan. 22, 1957 |
| 2,783,665 | Saunders | Mar. 5, 1957 |

FOREIGN PATENTS

| | | |
|---|---|---|
| 162,208 | Great Britain | Apr. 28, 1921 |
| 337,997 | Great Britain | Nov. 13, 1930 |